United States Patent
Anand et al.

(10) Patent No.: US 7,665,291 B2
(45) Date of Patent: Feb. 23, 2010

(54) METHOD AND SYSTEM FOR HEAT RECOVERY FROM DIRTY GASEOUS FUEL IN GASIFICATION POWER PLANTS

(75) Inventors: Ashok Kumar Anand, Niskayuna, NY (US); Patrick King Wah May, Schenectady, NY (US); Michael Jandrisevits, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 11/396,684

(22) Filed: Apr. 4, 2006

(65) Prior Publication Data

US 2007/0277529 A1    Dec. 6, 2007

(51) Int. Cl.
  F02C 7/28    (2006.01)
  F02C 7/22    (2006.01)
  F02C 6/18    (2006.01)
(52) U.S. Cl. .................... 60/39.12; 60/39.182; 60/736; 60/650; 60/39.464
(58) Field of Classification Search ............... 60/39.12, 60/39.464, 39.465, 39.182, 736, 650
See application file for complete search history.

(56) References Cited

U.S. PATENT DOCUMENTS

| 4,442,665 | A | * | 4/1984 | Fick et al. ................. 60/39.12 |
| 4,608,818 | A | * | 9/1986 | Goebel et al. .............. 60/39.12 |
| 4,723,407 | A | * | 2/1988 | Goebel et al. .............. 60/39.12 |
| 5,132,007 | A |   | 7/1992 | Meyer et al. |
| 5,865,023 | A | * | 2/1999 | Sorensen et al. ........... 60/39.12 |
| 6,130,259 | A | * | 10/2000 | Waycuilis .................. 60/39.12 |
| 6,314,715 | B1 |   | 11/2001 | Stats |
| 6,370,880 | B1 |   | 4/2002 | Smith et al. |
| 6,824,575 | B1 |   | 11/2004 | Otomo et al. |
| 6,830,596 | B1 |   | 12/2004 | Deckman et al. |
| 6,832,565 | B2 |   | 12/2004 | Chandran et al. |
| 6,997,118 | B2 |   | 2/2006 | Chandran et al. |

OTHER PUBLICATIONS

McDaniel, "Tampa Electric Polk Power Station Integrated Gasification Combined Cycle Project", Final Technical Report, Aug. 2002, 244 pages.

* cited by examiner

Primary Examiner—Ted Kim
(74) Attorney, Agent, or Firm—Nixon & Vanderhye, PC

(57) ABSTRACT

A system and method for recovering heat from dirty gaseous fuel (syngas), wherein the pressure of clean fuel gas is elevated to a pressure higher than that of the dirty syngas and then the pressurized clean fuel gas is fed to a heat recovery unit for heat exchange with the dirty syngas. Consequently, in the event of a leak in the heat recovery unit, the flow is from the clean fuel side to the dirty syngas side, thereby avoiding the possibility of contamination of the clean fuel gas.

10 Claims, 1 Drawing Sheet

METHOD AND SYSTEM FOR HEAT RECOVERY FROM DIRTY GASEOUS FUEL IN GASIFICATION POWER PLANTS

BACKGROUND OF THE INVENTION

In integrated Gasification Combined Cycle Power Plants, fuel gas for use in the gas turbine is produced at high pressure and high temperature in the gasification unit. The fuel gas produced by the gasification process unit, known as syngas, contains particulate matter and other harmful contaminants which must be removed to very low levels prior to use as fuel in the combustor of the gas turbine. In order to improve efficiency, many gasification power plants recover heat from the dirty syngas by heating hot water to steam and/or by heating clean fuel gas. However, due to the corrosive and erosive nature of dirty syngas in heat recovery heat exchangers, such heat recovery units are prone to developing leaks with the result that dirty syngas can mix with clean fuel gas, causing heavy damage and potentially resulting in failure of the gas turbine.

BRIEF DESCRIPTION OF THE INVENTION

The method and system of the invention incorporates a compressor or the like for pressurizing clean fuel gas upstream of heat recovery from the dirty gaseous fuel (syngas). Elevating the pressure of the clean fuel gas to a pressure higher than that of the dirty syngas avoids the possibility of contamination of the clean fuel gas by leakage of dirty syngas into the clean fuel side by ensuring that in the event of a leak, flow is from the clean fuel side to the dirty syngas side.

Thus, the invention may be embodied in an integrated gasification power plant including a heat recovery unit for recovering heat from produced gaseous fuel, in advance of gaseous fuel purification to produce clean fuel gas, by elevating the temperature of clean fuel gas through heat exchange with the gaseous fuel, and including a compressor for elevating the pressure of said clean fuel gas upstream of the heat recovery unit to a pressure greater than a pressure of the gaseous fuel in the heat recovery unit.

The invention may also be embodied in a method of recovering heat from gaseous fuel produced in an integrated gasification power plant, comprising: flowing gaseous fuel produced in a gasification unit of the integrated gasification power plant to a heat recovery unit in advance of gaseous fuel purification; purifying said produced gaseous fuel to produce clean fuel gas; elevating the pressure of said clean fuel gas to a pressure greater than a pressure of the gaseous fuel in the heat recovery unit; and flowing the pressurized clean fuel gas to the heat recovery unit for heating said pressurized clean fuel gas through heat exchange with said produced gaseous fuel.

The invention may also be embodied in an integrated gasification power plant comprising: a gasification unit for producing gaseous fuel; a heat recovery unit for recovering heat from the produced gaseous fuel; a flow path for produced gaseous fuel from said gasification unit to said heat recovery unit; a gaseous fuel purification and conditioning unit for producing clean fuel gas from said gaseous fuel; a flow path for gaseous fuel from said heat recovery unit to said purification and conditioning unit; a compressor for elevating a pressure of said clean fuel gas to a pressure greater than a pressure of said produced gaseous fuel in said heat recovery unit; a flow path for clean fuel gas from said purification and conditioning unit to said compressor; a flow path for pressurized clean fuel gas from said compressor to said heat recovery unit; a flow path for pressurized clean fuel gas through said heat recovery unit for heat exchange with said produced gaseous fuel; a power plant unit for producing power using said heated clean fuel gas; and a flow path for heated clean fuel gas from said heat recovery unit to said power plant unit.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
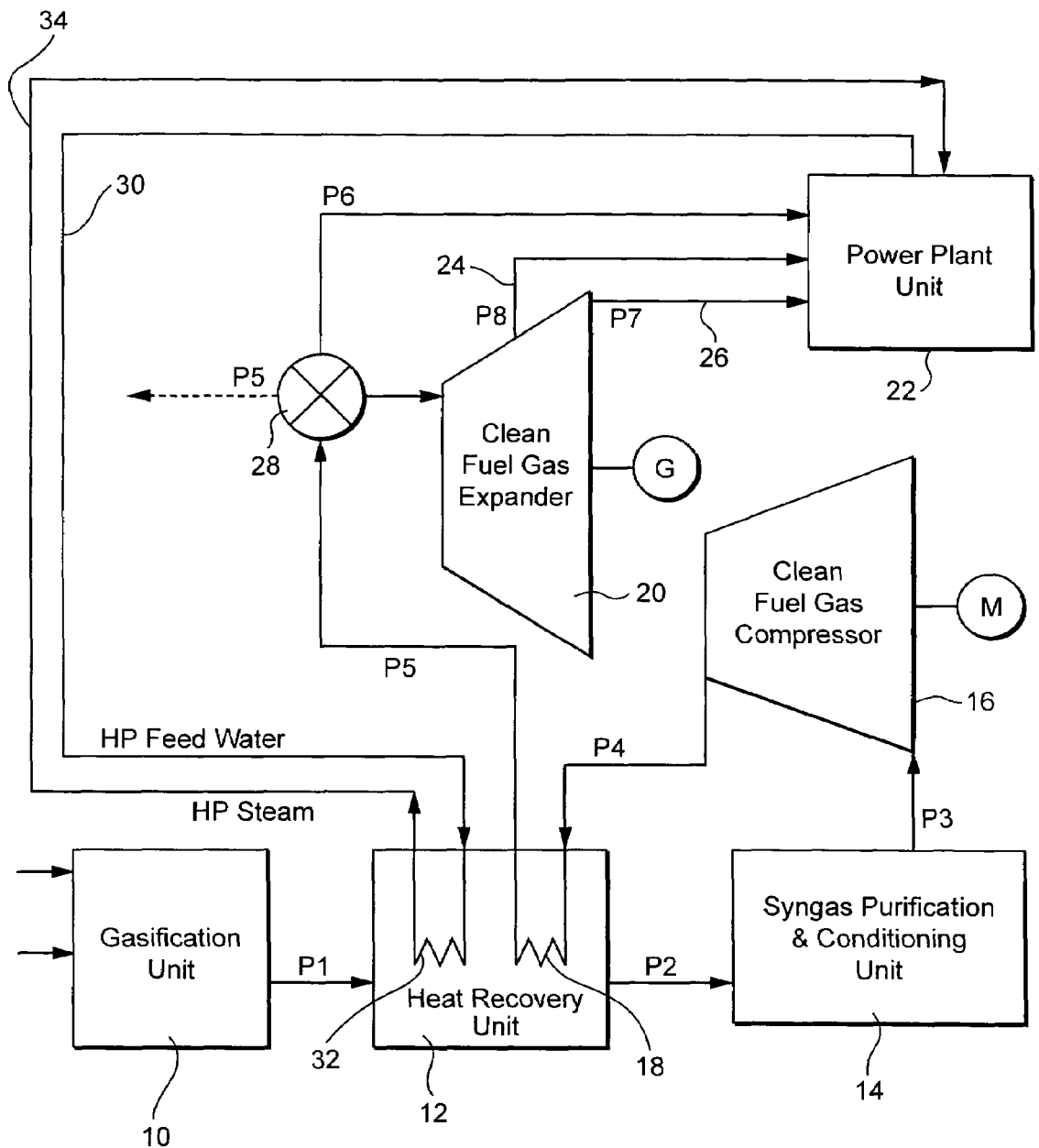
FIG. 1 schematically illustrates heat recovery from dirty gaseous fuel according to an example embodiment of the invention.

In a typical gasification unit, under pressure and using an oxidant such as oxygen, the raw fuel, such as coal, is converted to combustible gaseous fuel (syngas) at a temperature ranging from 1500 to 2500° F., depending upon the type of gasification technology. The produced syngas contains particulate mater such as ash and unburnt carbon, as well as corrosive contaminants such as ammonia, hydrochloric acid, hydrogen sulfide and carbonyl sulfide, etc. Thus, this so-called dirty syngas is unsuitable for direct use in the power plant combustors. The dirty syngas is ordinarily cooled to recover its thermal energy in a heat recovery unit before contaminant removal. This thermal energy may be used by boiler feed water to produce high pressure steam and generate electricity in a steam turbine generator portion of a power plant. In addition, or in the alternative, a portion of the thermal energy may be used to heat the cleaned fuel gas before it is fired in the power plant, such as in the gas turbine combustors.

As noted above, due to the corrosive and erosive nature of the dirty syngas, heat recovery units are prone to developing leaks with the result that dirty syngas can mix with clean fuel gas, causing heavy damage and potentially resulting in failure of the gas turbine. To address this issue, the invention provides a system and method wherein, upstream of heat recovery from the dirty syngas, the pressure of the clean fuel gas is elevated to a pressure higher than that of the dirty syngas. This ensures that, in the event of a leak, the flow is from the clean fuel side to the dirty syngas side, thereby avoiding the possibility of contamination of the clean fuel gas due to leakage of dirty syngas to the clean fuel side.

An example system and method for recovering heat from dirty syngas in a safe and efficient manner by avoiding the possibility of contamination and leakage of dirty gas into clean fuel gas in the event of damage or failure is illustrated in FIG. 1.

As illustrated, the dirty syngas produced by the gasification unit 10 is directed to a heat recovery unit 12, where the temperature of clean fuel gas and/or high pressure feed water is elevated through heat exchange with the hot dirty syngas. From the heat recovery unit 12, the dirty syngas is flowed to a syngas purification and conditioning unit 14. In the purification and conditioning unit 14, the dirty syngas is scrubbed to remove particulate matter and purified by removing harmful contents. The pressure of the syngas falls progressively due to losses from its highest value (P1) at the inlet to the heat recovery unit 12 to a lower pressure at the outlet of the heat recovery unit 12 (P2) to its lowest pressure (P3) where the cleaned fuel gas is discharged from the gas purification and conditioning unit 14.

To ensure that dirty fuel gas flowing through the heat recovery unit 12 will never mix into the clean fuel gas flow in the event of a tube leak or failure in the heat recovery unit, the pressure of the clean fuel gas is raised to a value higher than the highest gas pressure (P1) of the dirty syngas. In the example embodiment of FIG. 1, a compressor 16 is provided for pressurizing the clean fuel gas to a pressure P4 greater than the pressure of the dirty syngas flowing through the Heat Recovery Unit 12. The pressure of the clean fuel gas will also fall progressively due to losses so that the clean fuel gas exiting the heat recovery unit is at a pressure (P5), which is lower than the compressor outlet pressure (P4). In an example embodiment the pressure of the clean fuel gas is elevated, e.g. by compressor 16, however, to a sufficiently high pressure (P4) that the pressure (P5) of the clean fuel gas exiting the heat recovery unit is greater than the pressure of the syngas flowing through the heat recovery unit, which may be less than the inlet pressure (P1) but will be greater than the outlet pressure (P2). Because the clean fuel gas has been elevated to a pressure sufficiently higher than that of the dirty syngas in the Heat Recovery Unit 12, it is ensured that dirty fuel gas will never flow into and mix with the clean fuel gas in the clean fuel gas path 18 through the Heat Recovery Unit 12. The heated, clean fuel gas (at pressure P5) is thus available for safe use in the power plant combustors.

As schematically illustrated in FIG. 1, additional optional modifications to the conventional system may be effected individually or in appropriate combination based on the economic benefits for a given application. Thus, a gas expander generator 20 may be provided to recover pressure energy from the heated and pressurized fuel gas prior to its use in a power plant 22. As the illustrated example, extractions may be provided at desired pressure conditions for the power plant 22, such as, for example, an extraction 24 at pressure (P8) and an extraction 26 at a lesser pressure (P7). Additional or fewer extractions could be provided. The gas expander generator may be provided to recover pressure energy of heated and pressurized fuel gas prior to its use in gas turbine combustors and HRSG duct burners, extracted at desired pressure conditions for a gas turbine combined cycle power plant. The gas expander generator may also be provided to recover pressure energy of heated and pressurized fuel gas prior to its use in a boiler combustor, extracted at desired pressure conditions for a steam turbine generator power plant. As illustrated, a fuel distributor valve 28 may be provided to provide fuel for export, multiple users and/or to bypass the fuel expander 20 in the event it is not in operation, for input to the power plant, at pressure (P6).

As also illustrated in FIG. 1, a flow path 30 may also be provided for flowing high pressure feed water from the power plant for being heated in flow path 32 in the heat recovery unit to produce high pressure steam for return to the power plant 22 through return line 34.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An integrated gasification power plant including:
   a heat recovery unit comprising a heat exchanger for recovering heat from produced gaseous fuel, in advance of gaseous fuel purification with a gaseous fuel purifier to produce clean fuel gas, by elevating the temperature of the produced clean fuel gas through heat exchange with the gaseous fuel,
   a compressor for elevating the pressure of said clean fuel gas upstream of the heat exchanger to a pressure greater than a pressure of the gaseous fuel in the heat exchanger such that, in the heat exchanger, the clean gas is always at a higher pressure than the gaseous fuel,
   a flow path being defined for feeding the pressurized clean fuel gas directly from the compressor to the heat exchanger without any intervening mechanical structure, so that the pressurized clean fuel gas that flows into the heat exchanger is always at a higher pressure than the gaseous fuel in the heat exchanger, and
   a clean fuel gas expander downstream of the heat recovery unit for recovering pressure energy from the pressurized and heated clean fuel gas upstream of the power plant.

2. An integrated gasification power plant as in claim 1, further comprising a fuel gas distribution valve downstream of the heat recovery unit for selectively distributing the pressurized and heated clean fuel gas downstream of the heat recovery unit.

3. An integrated gasification power plant as in claim 1, wherein the power plant is a gas turbine combined cycle power plant, and the clean fuel gas is extracted from said clean fuel gas expander at a selected pressure for combustion in gas turbine combustors or HRSG duct burners of the combined cycle power plant.

4. An integrated gasification power plant as in claim 1, wherein the power plant is a steam turbine generator power plant, and the clean fuel gas is extracted from said clean fuel gas expander at a selected pressure for combustion in a boiler combustor of the steam turbine generator power plant.

5. An integrated gasification power plant as in claim 1, further comprising a flow path for heating high pressure feed water from the power plant in the heat recovery unit to produce high pressure steam for return to the power plant.

6. An integrated gasification power plant comprising:
   a gasification unit for producing gaseous fuel;
   a heat recovery unit comprising a heat exchanger for recovering heat from the produced gaseous fuel;
   a flow path for produced gaseous fuel from said gasification unit to said heat exchanger;
   a gaseous fuel purification and conditioning unit for producing clean fuel gas from said gaseous fuel;
   a flow path for gaseous fuel from said heat exchanger to said purification and conditioning unit;
   a compressor for elevating a pressure of said clean fuel gas to a pressure greater than a pressure of said produced gaseous fuel in said heat exchanger such that, in the heat exchanger, the clean fuel gas is always at a higher pressure than the gaseous fuel;
   a flow path for clean fuel gas from said purification and conditioning unit to said compressor;
   a flow path for pressurized clean fuel gas directly from said compressor to said heat exchanger without any intervening mechanical structure, so that the pressurized clean fuel gas that flows into the heat exchanger is always at a higher pressure than the gaseous fuel in the heat exchanger;
   a flow path for pressurized clean fuel gas through said heat exchanger for heat exchange with said produced gaseous fuel;
   a power plant unit for producing power using said heated clean fuel gas;
   a flow path for heated clean fuel gas from said heat recovery unit to said power plant unit; and a clean fuel gas expander along said flow path for heated clean fuel gas for recovering pressure energy from the pressurized and heated clean fuel gas upstream of the power plant unit.

7. An integrated gasification power plant as in claim 6, further comprising a fuel gas distribution valve along said a flow path for heated clean fuel gas for selectively distributing the pressurized and heated clean fuel gas downstream of the heat recovery unit.

8. An integrated gasification power plant as in claim 6, wherein the power plant unit is a gas turbine combined cycle power plant, and the clean fuel gas is extracted from said clean fuel gas expander at a selected pressure for combustion in gas turbine combustors or HRSG duct burners of the combined cycle power plant.

9. An integrated gasification power plant as in claim 6, wherein the power plant unit is a steam turbine generator power plant, and the clean fuel gas is extracted from said clean fuel gas expander at a selected pressure for combustion in a boiler combustor of the steam turbine generator power plant.

10. An integrated gasification power plant as in claim 6, further comprising a flow path for flowing high pressure feed water from the power plant unit to and through the heat recovery unit to produce high pressure steam and for flowing the high pressure steam to the power plant unit.

* * * * *